(12) United States Patent
Berkay et al.

(10) Patent No.: US 9,024,475 B2
(45) Date of Patent: May 5, 2015

(54) STANDBY POWER SUPPLY DEVICE

(75) Inventors: Cengiz Berkay, Istanbul (TR); Osman Osman, Istanbul (TR); Osman Yilmaz, Istanbul (TR)

(73) Assignee: Arcelik Anonim Sirketi, Istanbul (TR)

( * ) Notice: Subject to any disclaimer, the term of this patent is extended or adjusted under 35 U.S.C. 154(b) by 973 days.

(21) Appl. No.: 13/131,247

(22) PCT Filed: Nov. 12, 2009

(86) PCT No.: PCT/EP2009/065073
§ 371 (c)(1),
(2), (4) Date: May 25, 2011

(87) PCT Pub. No.: WO2010/060806
PCT Pub. Date: Jun. 3, 2010

(65) Prior Publication Data
US 2011/0234007 A1    Sep. 29, 2011

(30) Foreign Application Priority Data
Nov. 25, 2008  (TR) ............... a 2008 08998

(51) Int. Cl.
*H02J 7/00*  (2006.01)
*H02J 9/00*  (2006.01)

(52) U.S. Cl.
CPC .................. *H02J 9/005* (2013.01)

(58) Field of Classification Search
USPC ............................................. 307/66
See application file for complete search history.

(56) References Cited

U.S. PATENT DOCUMENTS

| | | | |
|---|---|---|---|
| 3,308,306 | A | 3/1967 | Bagno |
| 4,730,121 | A | 3/1988 | Lee et al. |
| 5,315,549 | A | 5/1994 | Scherpenberg et al. |
| 6,373,237 | B1 * | 4/2002 | Oldendorf et al. ............ 324/105 |
| 2002/0012258 | A1 * | 1/2002 | Nagai et al. .................... 363/95 |
| 2006/0076934 | A1 | 4/2006 | Ogata et al. |
| 2007/0090792 | A1 | 4/2007 | Sim et al. |
| 2010/0109433 | A1 * | 5/2010 | Chen et al. ...................... 307/29 |

* cited by examiner

*Primary Examiner* — Jared Fureman
*Assistant Examiner* — Duc M Pham
(74) *Attorney, Agent, or Firm* — Venjuris, P.C.

(57) ABSTRACT

The present invention relates to an electronic device (1) comprising a control-supply circuit (2) which, by means of a microprocessor (3) and a battery (4), prevents the battery (4) from consuming energy when the device (1) is not connected to the mains and in the stand-by mode, and which, furthermore, serves as a power supply in the stand-by mode.

3 Claims, 2 Drawing Sheets

STANDBY POWER SUPPLY DEVICE

TECHNICAL FIELD

The present invention relates to an electronic device which can operate with low energy in stand-by mode.

THE PRIOR ART

Batteries of electronic devices, which are supplied by battery and used by being connected to the mains, continue to run down while the devices are kept in the warehouse. Cash registers using memory battery and DVD players, televisions and computers using memory battery for storing the date data can be cited as examples of these devices. The said devices continue to use the batteries as long as the batteries are not deactivated by means of a switch. For example, the BIOS battery used in computers continues to be used while the computer is kept in the warehouse. In order to prevent the unnecessary energy draw from the battery in warehouse conditions, the batteries are disconnected from the other elements by means of mechanical or electronic switches. For this purpose, circuits that control the connection of the battery and serve as a sensor are used.

Furthermore, as long as the battery is not disconnected when the device is in the stand-by mode, at least a certain amount of current is drawn from the batteries while the energy required by the microprocessor is provided. Therefore, as in the situation that the device is kept in the warehouse, the battery power is used apart from its primary function also in the stand-by mode. In the present embodiments, separate circuit designs are used to solve these two problems.

In the state of the art United States of America Patent Document No U.S. Pat. No. 4,730,121, a power control circuit, which transmits the voltages of a primary power source and of a backup battery to the power output terminal in a controlled manner, is described. In the situation that an isolation signal is received, both power sources can be isolated from the power output terminal.

In the state of the art United States of America Patent Document No U.S. Pat. No. 5,315,549, an embodiment that relates to the switching of the batteries used in memory supply is described. In the invention, in order to prevent the unnecessary energy draw from the batteries, the batteries are isolated from the other elements by using MOSFET switches.

Figure 1:
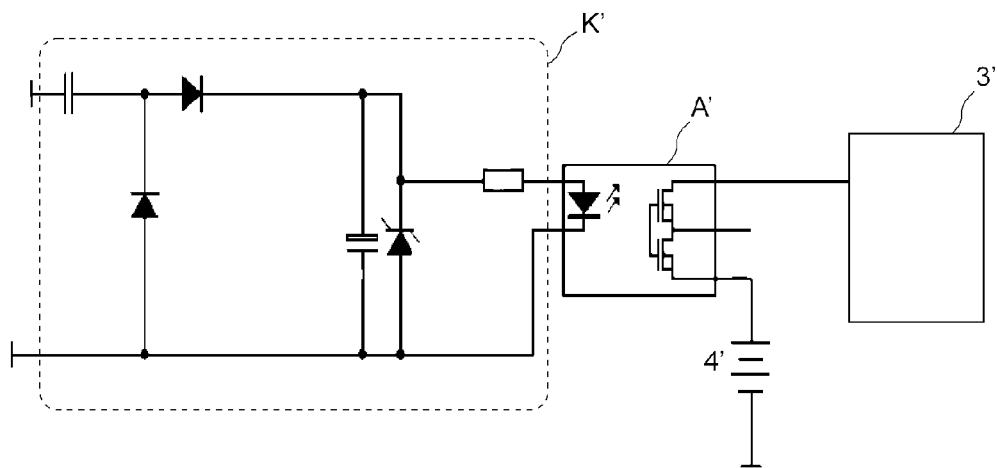
Figure 2:
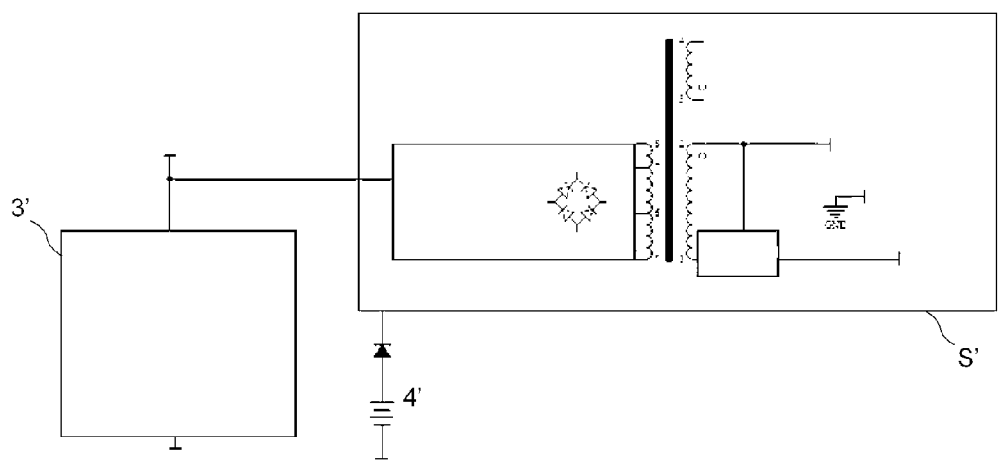

In prior art embodiments, functions of deactivating the battery (4') in warehouse conditions and providing the microprocessor (3') with the required energy in the stand-by mode are performed by separate circuits. The battery (4') connection is controlled by a control circuit (mains sensor circuit) (K') which switches a switch (A') (FIG. 1). The stand-by mode power is provided by a separate circuit generally by using a switched-mode power source (SMPS) (S') (FIG. 2).

BRIEF DESCRIPTION OF THE PRESENT INVENTION

The aim of the present invention is the realization of an electronic device, the running down of the battery of which is slowed down while being kept in the warehouse or in the stand-by mode.

By means of the electronic device realized in order to attain the aim of the present invention, explicated in the first claim and the respective claims thereof, by a single circuit, the battery is prevented from consuming energy in warehouse conditions and in the stand-by mode, and the energy required for the microprocessor in the stand-by mode is provided.

While these two functions are performed by separate circuits in the state of the art, a compact solution with a lower cost is provided in the electronic device of the present invention by a single circuit performing the two functions. The circuit, which is a power supply providing stand-by mode energy at the level of both mains sensor and microamperes, alone serves as control and supply circuit. Thus, an electronic device is realized, which is supplied by the battery during the transition to the normal mode from the stand-by mode and also for a short time (several milliseconds) when the device is connected to the mains, and which can realize low power consumption in the stand-by mode, and which provides advantage both in production cost and in energy consumption when compared with similar embodiments of the prior art.

DETAILED DESCRIPTION OF THE PRESENT INVENTION

The electronic device and the control-supply circuit it comprises, realized in order to attain the aim of the present invention, are illustrated in the attached figures.

FIG. 1—is the schematic view of a mains sensor circuit of the prior art.

FIG. 2—is the schematic view of a stand-by mode power supply circuit of the prior art.

Figure 3:
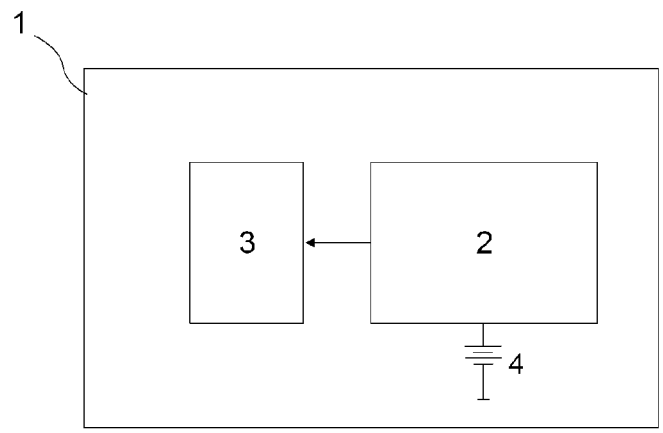

FIG. 3—is the schematic view of an electronic device.

Figure 4:
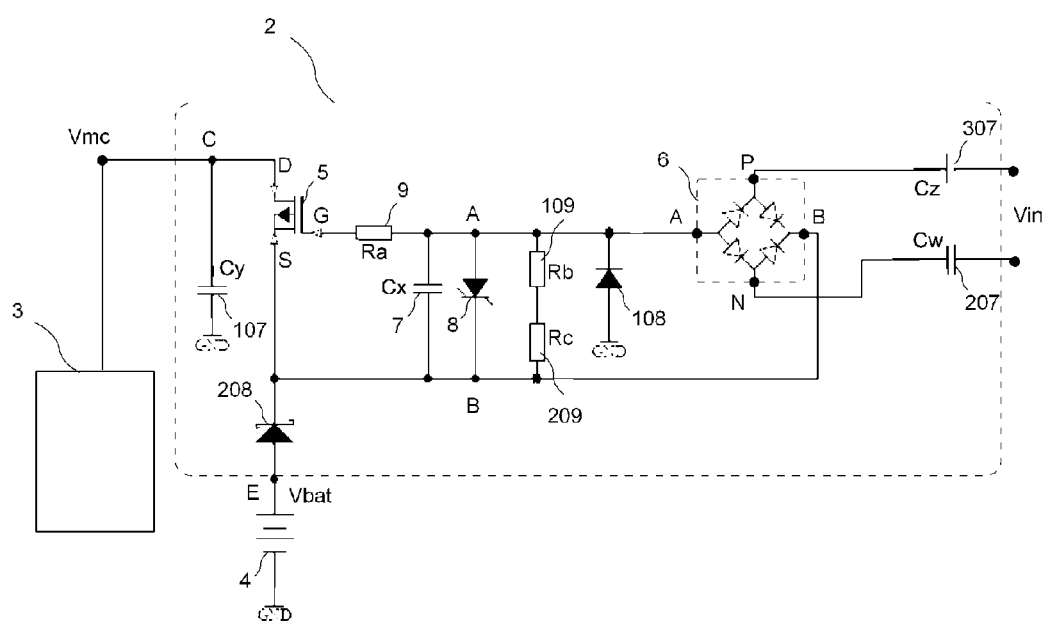

FIG. 4—is the schematic view of the control and supply circuit of the present invention.

The elements illustrated in the figures are numbered as follows:
1. Device
2. Circuit
3. Microprocessor
4. Battery
5. Transistor
6. Rectifier
7. 107, 207, 307 Capacitor
8. 108, 208 Diode
9. 109, 209 Resistor The electronic device (1) of the present invention comprises a control-supply circuit (2) which is supplied by mains voltage, a microprocessor (3) and a battery (4) (FIG. 3).

The control-supply circuit (2) provides the microprocessor (3) with the required power supply (Vmc) in the stand-by mode and controls the connection of the battery (4) with the device (1). The control-supply circuit (2) comprises at least one transistor (5), at least one rectifier (6), more than one capacitor (7, 107, 207, 307), more than one diode (8, 108, 208) and more than one resistor (9, 109, 209) elements (FIG. 4). The rectifier (6) is a diode bridge preferably consisting of four diodes. The control-supply circuit (2) has electrical connection with the mains input (Vin), the battery (4) and the microprocessor (3) (FIG. 4). The mains input voltage (Vin) is rectified by flowing through the capacitors (307, 207), which are situated on the phase and neutral lines and which have the capacities of Cz and Cw, respectively, and through a rectifier (6), to which these lines are connected. In this way, for the circuit (2), the capacitors (307, 207) and the rectifier (6) provide energy for switching the switch (transistor) and also provide the stand-by/sleep mode energy. The phase and neutral lines are connected to the P and N nodes of the rectifier (6), respectively.

A capacitor (7) which has a capacity of Cx, a diode (8), the anode of which is connected to A and the cathode of which is connected to B, and two resistors (109, 209), which are connected to each other in series and which have the values of Rb and Rc, are connected to each other in parallel between the A and B-nodes of the rectifier (6). The circuit (2), consisting of the capacitor (7), the diode (8) and the resistors (109, 209) between A and B nodes, feeds the microprocessor (3) in the stand-by mode. A diode (108), the cathode of which is connected to A-node and the anode of which is connected to the ground (GND), a transistor (5), a capacitor (107) having the capacity of Cy, a resistor (9) having the resistance of Ra, and a diode (208) are furthermore situated in the circuit (2). The transistor (5) is preferably a MOSFET. The resistor (9) is connected between A-node and the transistor (5) gate (G). The source (S) of the transistor (5) is connected to B-node and the drain (D) of it is connected to C-node, which is the output of the control-supply circuit (2). The C-node is the node wherein the microprocessor (3) and the circuit (2) are connected, and the power supply of the microprocessor (3) in the stand-by mode is provided with the voltage (Vmc) on this node. The capacitor (107) is connected between the C-node and the ground (GND) at the output of the control-supply circuit (2). The battery (4) connection of the circuit (2) is provided through the E-node. A diode (208), which provides the battery (4) connection to be deactivated, is connected between B and E-nodes. The anode of the diode (208) is connected to E-node and the cathode of it is connected to B-node.

The microprocessor (3) controls the circuits and components (such as the receiver unit which will receive the switching commands) which are required in the transition of the device (1) to the stand-by mode and during the transition of the device (1) from the stand-by mode to the normal operating mode. In order that the transition from the stand-by mode to the normal operating mode can be performed when desired, the microprocessor (3) is supplied with a minimum amount of energy when the device (1) is in the stand-by mode. In the device (1) of the present invention, the said energy is provided by the control-supply circuit (2).

The battery (4) is used as a temporary power supply during the transition from the stand-by mode to the normal operating mode and also for a short time (several milliseconds) when the device (1) is connected to the mains. When the device (1) is not connected to the mains, the mains input voltage (Vin) is equal to zero. Accordingly, no voltage difference occurs between A-B nodes of the circuit (2), also. Therefore, the voltage, which will be enough to switch on the transistor (5) and let D-S ends to join the transmission, does not occur between G-S ends of the transistor (5). In this situation, when the device (1) is not connected to the mains, that is, when the device (1) is unplugged, the connection between the battery (4) and the microprocessor (3) is open-circuit. Therefore, the microprocessor (3) does not draw current from the battery (4) and thus, the battery (4) is prevented from consuming energy.

When the device (1) is connected to the mains, the transistor (5) starts transmitting and activates the battery (4). The low energy at the level of microwatts (μw) that is needed by the microprocessor (3) when the device (1) is in the stand-by mode is provided by the energy received through the mains at the side of the control-supply circuit (2). Since the voltage at B-node is greater than the voltage at E-node while supplying the microprocessor (3) from the mains, no current flows through the diode (208) located at the battery (4) output of the circuit (2). Thus, the connection of the battery (4) with the circuit (2) becomes open-circuit and no current is drawn from the battery (4) in the stand-by mode.

During the transition of the device (1) to the normal operating mode from the stand-by mode, the microprocessor (3) is activated and the need for energy increases. Since the stand-by mode energy provided by the control-supply circuit (2) during the transition is insufficient, the rest of the relatively high current required temporarily is drawn from the battery (4) for a short time. After the transition to the normal operating mode is performed, the microprocessor (3) starts to be supplied from the main power supply (not illustrated in the figures) and no current is drawn through from the circuit (2) and from the battery (4) in the normal mode. Thus, a small amount of power is consumed in the stand-by mode in the device (1) and battery (4) energy is not consumed in the stand-by mode and also when the device (1) is not connected to the mains.

By means of the control-supply circuit (2) explained in details above, a device (1) is provided wherein battery (4) energy is not consumed in warehouse conditions and in the stand-by mode. The control-supply circuit (2) is supplied by the battery (4) only during the transition to the normal mode from the stand-by mode and also for a short time (several milliseconds) when the device (1) is connected to the mains. The control-supply circuit (2) both provides the energy required for the microprocessor (3) and, in order to prevent the unnecessary consumption of the battery (4) energy, provides the battery (4) to be deactivated when the device (1) is in warehouse conditions and in the stand-by mode.

The invention claimed is:

1. An electronic device (1) comprising a control-supply circuit (2) which is supplied by mains voltage, a microprocessor (3) which has electrical connection with the control-supply circuit (2) and a battery (4) and characterized by
the battery (4) which provides a part of the current required for the microprocessor (3) and therefore, which is used as a temporary power supply during the transition of the device (1) from the stand-by mode to the normal operating mode and also for a short time when the device (1) is connected to the mains,
a transistor (5) which, by means of the device (1) being switched off when not connected to the mains, makes the connection between the microprocessor (3) and the battery (4) open-circuit and thus, prevents the battery (4) from consuming energy, and
a diode (208), the anode of which is connected to the E-node whereto the battery (4) is connected, and the cathode of which is connected to B-node, and which provides the battery (4) connection to be deactivated in the stand-by mode and thus, prevents the battery (4) from consuming energy and having by two capacitors (307, 207) which, for the circuit (2), provide energy for switching a switch (transistor) and also provide the stand-by mode energy, and which are situated on the phase and neutral lines of the mains input connection, and by a rectifier (6) to which these lines are connected and further comprising a capacitor (7), a diode (8), the anode of which is connected to A and the cathode of which is connected to B, and two resistors (109, 209) which are connected to each other in series, while all these elements are connected between A and B-nodes of the rectifier (6), characterized by the control-supply circuit (2) wherein the capacitor (7), the diode (8) and the resistors (109, 209) provide the regulation of the voltage (Vmc), which feeds the microprocessor (3), in the stand-by mode.

2. The electronic device (1) as in claim 1, characterized by the control-supply PatXML 8/8 circuit (2) wherein the transistor (5) is a MOSFET.

3. A device (1) as in claim 2, characterized by the transistor (5), between A-node and the gate (G) of which a resistor (9) is connected, and the source (S) of which is connected to B-node and the drain (D) of which is connected to C-node, the output of the control-supply circuit (2).

* * * * *